United States Patent
Ryon et al.

(10) Patent No.: US 11,561,009 B2
(45) Date of Patent: Jan. 24, 2023

(54) AXIALLY ORIENTED INTERNALLY MOUNTED CONTINUOUS IGNITION DEVICE: REMOVABLE NOZZLE

(71) Applicant: Delavan Inc., Des Moines, IA (US)

(72) Inventors: Jason Ryon, Carlisle, IA (US);
Brandon P. Williams, Johnston, IA (US); Lev Alexander Prociw, Johnston, IA (US)

(73) Assignee: Delavan, Inc., Des Moines, IA (US)

( * ) Notice: Subject to any disclaimer, the term of this patent is extended or adjusted under 35 U.S.C. 154(b) by 14 days.

(21) Appl. No.: 17/125,114

(22) Filed: Dec. 17, 2020

(65) Prior Publication Data

US 2022/0195936 A1    Jun. 23, 2022

(51) Int. Cl.
*F23R 3/34* (2006.01)
*F02C 7/264* (2006.01)
(Continued)

(52) U.S. Cl.
CPC .............. *F23R 3/343* (2013.01); *F02C 7/264* (2013.01); *F02C 7/266* (2013.01); *F23R 3/283* (2013.01);
(Continued)

(58) Field of Classification Search
CPC .......... F23R 3/343; F23R 3/283; F23R 3/286; F23R 3/42; F02C 7/264; F02C 7/266;
(Continued)

(56) References Cited

U.S. PATENT DOCUMENTS 2,540,642 A    2/1951  Allen et al.
2,541,900 A    2/1951  Williams
(Continued)

FOREIGN PATENT DOCUMENTS

DE         1064760 B      9/1959
DE    102018214281 B3     8/2019
(Continued)

OTHER PUBLICATIONS

Parker, Metal Seal Design Guide 2016.*
(Continued)

*Primary Examiner* — Gerald L Sung
*Assistant Examiner* — Rene D Ford
(74) *Attorney, Agent, or Firm* — Kinney & Lange, P.A.

(57) ABSTRACT

An embodiment of a combustor for a gas turbine engine includes a combustor case, a combustor liner disposed within the combustor case, a fuel nozzle at an upstream end of the combustor liner, a torch igniter within the combustor case, and a removable fuel injector. The torch igniter includes a combustion chamber, a cap configured to receive a removable fuel injector and a surface igniter, a tip, an annular igniter wall extending from the cap to the tip and defining a radial extent of the combustion chamber, a structural wall coaxial with and surrounding the igniter wall, and an outlet passage within the tip which fluidly connects the combustion chamber to the combustor. The removable fuel injector extends through a fuel injector opening of the combustor case. The diameter of the fuel injector opening is wider than a fuel injector diameter of the removable fuel injector.

11 Claims, 3 Drawing Sheets

(51) Int. Cl.
 *F02C 7/266* (2006.01)
 *F23R 3/28* (2006.01)
 *F02C 7/22* (2006.01)
 *F23R 3/42* (2006.01)

(52) U.S. Cl.
 CPC ............ *F02C 7/22* (2013.01); *F05D 2220/32* (2013.01); *F05D 2230/80* (2013.01); *F05D 2240/35* (2013.01); *F05D 2260/99* (2013.01); *F23D 2207/00* (2013.01); *F23R 3/286* (2013.01); *F23R 3/42* (2013.01)

(58) Field of Classification Search
 CPC .... F02C 7/22; F05D 2220/32; F05D 2230/80; F05D 2240/35; F05D 2260/99; F23D 2207/00
 See application file for complete search history.

(56) References Cited

U.S. PATENT DOCUMENTS

| | | |
|---|---|---|
| 2,645,082 A | 7/1953 | Jorma |
| 2,648,951 A | 8/1953 | McDougal |
| 2,811,676 A | 10/1957 | Beye |
| 2,840,742 A | 6/1958 | Watters |
| 2,847,826 A | 8/1958 | Dennis |
| 2,864,234 A | 12/1958 | Seglem et al. |
| 2,885,859 A | 5/1959 | Barberis |
| 2,958,196 A | 11/1960 | Wie et al. |
| 2,967,224 A | 1/1961 | Irwin |
| 3,009,321 A | 11/1961 | Jones et al. |
| 3,487,636 A | 1/1970 | Scott et al. |
| 3,558,251 A | 1/1971 | Bauger et al. |
| 3,690,093 A | 9/1972 | Carlisle |
| 3,898,797 A | 8/1975 | Wood |
| 3,954,389 A * | 5/1976 | Szetela ................. F23M 5/085 60/753 |
| 3,990,834 A | 11/1976 | Dubell et al. |
| 4,012,904 A | 3/1977 | Nogle |
| 4,099,373 A | 7/1978 | Griffin et al. |
| 4,112,675 A | 9/1978 | Pillsbury et al. |
| 4,192,139 A * | 3/1980 | Buchheim ................. F23R 3/30 60/750 |
| 4,194,358 A | 3/1980 | Stenger |
| 4,351,156 A | 9/1982 | White et al. |
| 4,412,414 A | 11/1983 | Novick et al. |
| 4,441,323 A * | 4/1984 | Colley .................... F23R 3/283 60/737 |
| 4,828,488 A | 5/1989 | Reiser et al. |
| 4,860,533 A | 8/1989 | Joshi |
| 4,912,931 A | 4/1990 | Joshi et al. |
| 4,915,615 A | 4/1990 | Kawamura et al. |
| 5,085,040 A | 2/1992 | Tilston |
| 5,390,855 A | 2/1995 | Mims et al. |
| 5,469,700 A | 11/1995 | Corbett et al. |
| 5,499,497 A | 3/1996 | Defreitas |
| 5,636,511 A | 6/1997 | Pfefferle et al. |
| 5,640,841 A | 6/1997 | Crosby |
| 5,673,554 A | 10/1997 | Defreitas et al. |
| 5,695,328 A | 12/1997 | Defreitas et al. |
| 5,720,163 A | 2/1998 | Pfefferle et al. |
| 5,845,480 A | 12/1998 | Defreitas et al. |
| 6,138,654 A | 10/2000 | Pretorius et al. |
| 6,195,247 B1 | 2/2001 | Cote et al. |
| 6,240,731 B1 | 6/2001 | Hoke et al. |
| 6,247,300 B1 | 6/2001 | Muramatsu et al. |
| 6,483,022 B1 | 11/2002 | Packard |
| 6,884,967 B1 | 4/2005 | Leigh |
| 6,915,638 B2 | 7/2005 | Runkle et al. |
| 6,952,927 B2 | 10/2005 | Howell et al. |
| 6,968,699 B2 | 11/2005 | Howell et al. |
| 7,124,724 B2 | 10/2006 | Fleetwood |
| 7,137,255 B2 | 11/2006 | Schmotolocha et al. |
| 7,216,488 B2 | 5/2007 | Howell et al. |
| 7,470,875 B1 | 12/2008 | Wilcox et al. |
| 7,481,248 B2 | 1/2009 | Prociw et al. |
| 7,637,094 B2 | 12/2009 | Costello et al. |
| 8,365,710 B2 | 2/2013 | Lykowski et al. |
| 8,713,944 B2 | 5/2014 | Bleeker |
| 9,080,772 B2 | 7/2015 | Prociw et al. |
| 9,135,755 B2 | 9/2015 | Youssef |
| 9,279,398 B2 | 3/2016 | McAlister |
| 9,413,141 B2 | 8/2016 | Leglaye et al. |
| 9,453,491 B2 | 9/2016 | Tanaka et al. |
| 9,476,399 B1 | 10/2016 | Munson |
| 9,567,912 B2 | 2/2017 | Prociw et al. |
| 10,041,859 B2 | 8/2018 | Desilva et al. |
| 10,156,189 B2 | 12/2018 | Sze et al. |
| 10,488,047 B2 | 11/2019 | Ott et al. |
| 10,584,639 B2 | 3/2020 | Dam et al. |
| 10,711,699 B2 | 7/2020 | Dam et al. |
| 10,823,398 B2 | 11/2020 | Choudhri et al. |
| 11,209,164 B1 | 12/2021 | Ryon et al. |
| 11,226,103 B1 | 1/2022 | Ryon et al. |
| 11,255,535 B1 | 2/2022 | Eckert et al. |
| 2002/0050061 A1 | 5/2002 | Komyoji et al. |
| 2002/0162333 A1 | 11/2002 | Zelina |
| 2004/0050061 A1 | 3/2004 | Schmotolocha et al. |
| 2004/0168442 A1 | 9/2004 | Schmotolocha et al. |
| 2005/0053876 A1 | 3/2005 | Joos et al. |
| 2005/0166595 A1 | 8/2005 | Fletcher et al. |
| 2005/0284442 A1 | 12/2005 | Stuttaford et al. |
| 2006/0054233 A1 | 3/2006 | Prociw et al. |
| 2006/0168967 A1 | 8/2006 | Simons et al. |
| 2008/0036209 A1 | 2/2008 | Bulkovitch |
| 2008/0141651 A1 | 6/2008 | Eason et al. |
| 2008/0299504 A1 | 12/2008 | Horn |
| 2009/0234555 A1 | 9/2009 | Williams et al. |
| 2010/0126617 A1 | 5/2010 | Stroempl et al. |
| 2011/0088409 A1 | 4/2011 | Carlisle |
| 2011/0113787 A1 * | 5/2011 | Milosavljevic ......... F23R 3/343 60/737 |
| 2011/0247590 A1 | 10/2011 | Donovan |
| 2012/0085468 A1 | 4/2012 | Walker |
| 2012/0125008 A1 | 5/2012 | Prociw et al. |
| 2013/0000323 A1 | 1/2013 | Kupratis |
| 2013/0040255 A1 | 2/2013 | Shi et al. |
| 2013/0143171 A1 | 6/2013 | Soda et al. |
| 2014/0060063 A1 | 3/2014 | Boardman et al. |
| 2014/0150401 A1 | 6/2014 | Venter |
| 2014/0216384 A1 | 8/2014 | Tanaka et al. |
| 2014/0366505 A1 | 12/2014 | Prociw et al. |
| 2014/0366542 A1 | 12/2014 | Teets |
| 2014/0366551 A1 | 12/2014 | Prociw et al. |
| 2015/0036781 A1 | 2/2015 | Youssef |
| 2015/0040575 A1 | 2/2015 | Martinez Fabre et al. |
| 2015/0260406 A1 | 9/2015 | Carrere |
| 2015/0275755 A1 | 10/2015 | Ogata et al. |
| 2015/0275769 A1 | 10/2015 | Foutch et al. |
| 2015/0308351 A1 | 10/2015 | Sheridan |
| 2015/0345426 A1 | 12/2015 | Houston et al. |
| 2015/0345788 A1 | 12/2015 | Miyata et al. |
| 2015/0354517 A1 | 12/2015 | Mansour et al. |
| 2016/0003150 A1 | 1/2016 | Dicintio et al. |
| 2016/0010559 A1 | 1/2016 | Hoke et al. |
| 2016/0047318 A1 | 2/2016 | Dam et al. |
| 2016/0084169 A1 | 3/2016 | Stuttaford et al. |
| 2016/0169110 A1 | 6/2016 | Myers et al. |
| 2016/0230993 A1 | 8/2016 | Dai et al. |
| 2017/0138266 A1 | 5/2017 | Caples |
| 2017/0145852 A1 | 5/2017 | McCune et al. |
| 2017/0284298 A1 | 10/2017 | Suciu et al. |
| 2017/0350590 A1 | 12/2017 | Choudhri et al. |
| 2017/0356656 A1 | 12/2017 | Ogata et al. |
| 2018/0003388 A1 | 1/2018 | Park |
| 2018/0010795 A1 | 1/2018 | Nath et al. |
| 2018/0051710 A1 | 2/2018 | Takamura et al. |
| 2018/0058224 A1 | 3/2018 | Jennings et al. |
| 2018/0058331 A1 | 3/2018 | Barton et al. |
| 2018/0058404 A1 | 3/2018 | Tibbs |
| 2018/0100437 A1 | 4/2018 | Dicintio et al. |
| 2018/0134407 A1 | 5/2018 | Elbibary et al. |
| 2018/0154446 A1 | 6/2018 | Brown et al. |
| 2018/0170575 A1 | 6/2018 | Ziarno |

(56) References Cited

U.S. PATENT DOCUMENTS

| | | |
|---|---|---|
| 2018/0172271 A1 | 6/2018 | Moniz et al. |
| 2018/0179896 A1 | 6/2018 | Pal et al. |
| 2018/0179956 A1 | 6/2018 | Wertz |
| 2018/0283692 A1 | 10/2018 | Ryon et al. |
| 2018/0356095 A1 | 12/2018 | Patel et al. |
| 2018/0363555 A1 | 12/2018 | Zelina et al. |
| 2019/0010872 A1 | 1/2019 | Dam et al. |
| 2019/0024897 A1 | 1/2019 | Prociw et al. |
| 2019/0032561 A1 | 1/2019 | Stoia et al. |
| 2019/0178497 A1 | 6/2019 | Jones et al. |
| 2019/0249877 A1 | 8/2019 | Fryer |
| 2020/0080530 A1 | 3/2020 | Freer et al. |
| 2020/0088409 A1 | 3/2020 | Greenfield et al. |
| 2020/0191059 A1 | 6/2020 | Ryon et al. |
| 2020/0309378 A1 | 10/2020 | Dam et al. |
| 2020/0348024 A1 | 11/2020 | Hicks |
| 2021/0215100 A1 | 7/2021 | Head et al. |
| 2022/0007488 A1 | 1/2022 | Bai et al. |

FOREIGN PATENT DOCUMENTS

| | | |
|---|---|---|
| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |
| GB | 859184 A | 1/1961 |
| JP | 2015021715 A | 2/2015 |
| KR | 101279722 B1 | 6/2013 |

OTHER PUBLICATIONS

Extended European Search Report for EP Application No. 21205393.8, dated Mar. 17, 2022, 8 pages.
Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21214138.6, dated Apr. 25, 2022, 7 pages.
Extended European Search Report for EP Application No. 21192156.4, dated Feb. 1, 2022, 7 pages.
"Metal Seal Design Guide—High Performance Engineered Seals and Sealing Systems", from Parker Hannifin Corporation Composite Sealing Systems Division, 2016, 106 pages.
Database WPI—2017 Clarivate Analytics, Week 201919, Thomson Scientific, London GB; AN 2019-17673X XP002806356, 2 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21214883.7, dated May 13, 2022, pp. 10.
Extended European Search Report for EP Application No. 21212869.8, dated Apr. 28, 2022, pp. 7.
Extended European Search Report for EP Application No. 21213899.4, dated May 6, 2022, 8 pages.
Extended European Search Report for EP Application No. 21214511.4, dated Apr. 29, 2022, 8 pages.
Extended European Search Report for EP Application No. 21214798.7, dated May 11, 2022, 8 pages.
Extended European Search Report for EP Application No. 21214894.4, dated May 3, 2022, 9 pages.
Extended European Search Report for EP Application No. 21216163.2, dated May 16, 2022, 8 pages.
Extended European Search Report for EP Application No. 21209057.5, dated Jul. 19, 2022, 8 pages.

\* cited by examiner

AXIALLY ORIENTED INTERNALLY MOUNTED CONTINUOUS IGNITION DEVICE: REMOVABLE NOZZLE

BACKGROUND

The present disclosure relates to gas turbine engines and, more particularly, to orientations of torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Torch igniters mounted externally to a high pressure case of the gas turbine engine must be able to withstand a high pressure differential to prevent leaks. Mounting torch igniters within a high pressure case of the gas turbine engine does not require the torch igniters to withstand this high pressure differential. However, internal mounting within the high pressure case decreases the accessibility of the torch igniters and various elements that interact with them.

SUMMARY

In one embodiment, the present specification provides a combustor of a gas turbine engine oriented about an engine axis that includes a combustor case extending along a primary combustor centerline to convey compressed airflow from a compressor to a turbine section, a combustor liner disposed within the combustor case to define a main combustor zone, a fuel nozzle situated at an upstream end of the combustor liner relative to the primary combustor centerline, a torch igniter situated within the combustor case, and a removable fuel injector. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one surface igniter and at least one removable fuel injector, a tip defining the axially downstream end of the combustion chamber with respect to the torch igniter axis, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber. The removable fuel injector extends through a fuel injector opening of the combustor case having an opening diameter. The opening diameter is wider than a fuel injector diameter of the removable fuel injector. The combustion chamber is situated within the combustor case.

In another embodiment, the present specification provides a method of replacing a first removable fuel injector for a torch igniter within a gas turbine engine that includes disconnecting a fuel feed line from the first removable fuel injector, detaching a flange from a combustor case of the gas turbine engine, disengaging the first removable fuel injector from a cap of the torch igniter, removing the first removable fuel injector from the torch igniter through a fuel injector opening of the combustor case, inserting a second removable fuel injector into the fuel injector opening of the combustor case, engaging the second removable fuel injector with the cap of the torch igniter, reattaching the flange to the combustor case, and connecting the fuel feed line to the second removable fuel injector. The combustor case includes the fuel injector opening configured to receive a removable fuel injector and extends along a primary combustor centerline to convey compressed airflow from a compressor to a turbine section. The torch igniter includes a combustion chamber oriented about a torch igniter axis and having axially upstream and downstream ends defining a flow direction through the combustion chamber and along the torch igniter axis, the cap defining the axially upstream end of the combustion chamber and oriented about the torch igniter axis, a tip defining the axially downstream end of the combustion chamber, an igniter wall extending from the cap to the tip and defining a radial extent of the combustion chamber, a structural wall coaxial with and surrounding the igniter wall, and an outlet passage defined by the igniter wall within the tip and fluidly connected to the combustion chamber. The cap is configured to receive at least one surface igniter and a removable fuel injector. The combustion chamber of the torch igniter is located within the combustor case.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which also fall within the scope and spirit of the principles of the invention. The figures may not be drawn to scale, and applications and embodiments of the present invention may include features and components not specifically shown in the drawings.

DETAILED DESCRIPTION

The present disclosure provides structures and methods for replacing a removable fuel injector for a torch igniter within the combustor section of a gas turbine engine. The mounting of a torch igniter within the high pressure section of a gas turbine engine reduces stress on the combustion chamber of the torch igniter, while situating a fuel injector through the case of the high pressure section allows the fuel injector to be easily removed for maintenance or other purposes.

Figure 1:
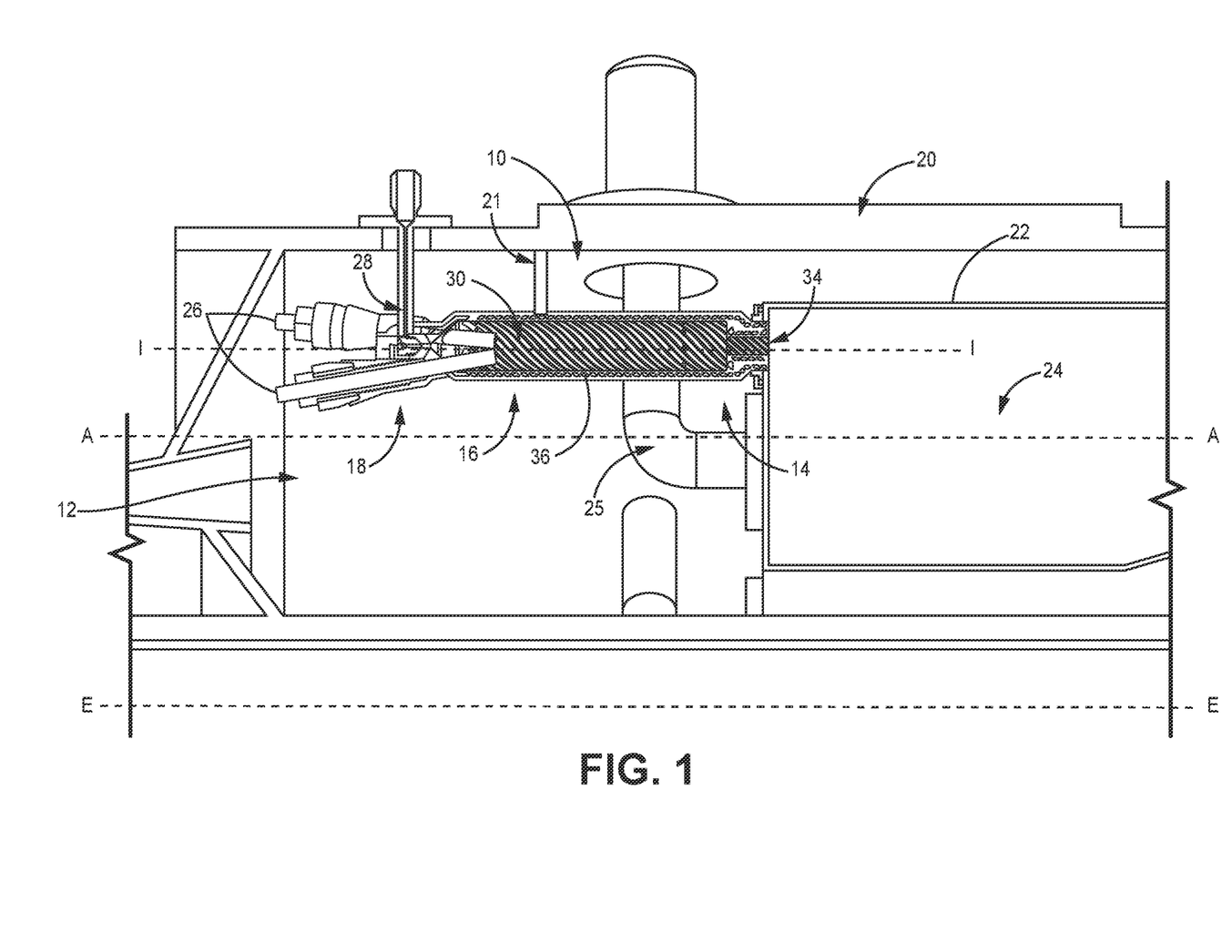
FIG. 1 is a cross-sectional view of an example of a torch igniter within the combustion section of a gas turbine engine.

FIG. 1 is a cross-sectional view of torch igniter 10 disposed within engine combustor section 12 of a gas turbine engine. Torch igniter 10 is composed of tip 14, combustion section 16, and cap 18. Torch igniter 10 is situated within high pressure case 20 and secured to high pressure case 20 by attachment 21. Tip 14 of torch igniter 10 is mounted through liner 22 of combustor 24. Fuel nozzle 25 provides fuel to combustor 24. The gas turbine engine is arranged such that high pressure case 20, liner 22, and combustor 24 are disposed circumferentially about engine axis E-E. Engine axis E-E is a rotational axis of the gas turbine engine. Primary combustor axis A-A is a centerline for the two-dimensional cross section of engine combustor section 12 shown in FIG. 1. The example of torch igniter 10 in FIG. 1 is shown as having three glow plugs 26, of which two glow plugs 26 are visible. However, there are possible embodiments having more or less than three glow plugs 26. Glow plugs 26 are surface igniters which can be resistively heated to ignite fuel from fuel injector 28 and create combustion within torch igniter 10, creating a flame within combustion chamber 30. Torch igniter 10 intakes air from an inlet disposed in cap 18 of torch igniter 10. The air may be high-pressure air from the main compressor of the gas turbine engine, or may be air from another high-pressure air source such as an auxiliary compressor. Combustion chamber 30 is in fluid communication with an internal volume of combustor 24 via an outlet within tip 14, allowing the flame created within combustion chamber 30 to reach the interior of combustor 24 and thereby ignite fuel within combustor 24. Igniter wall 32 (shown in FIG. 2) surrounds the internal volume of torch igniter 10, which includes combustion chamber 30 and outlet passage 34. Structural wall 36 coaxially surrounds igniter wall 32.

Figure 2:
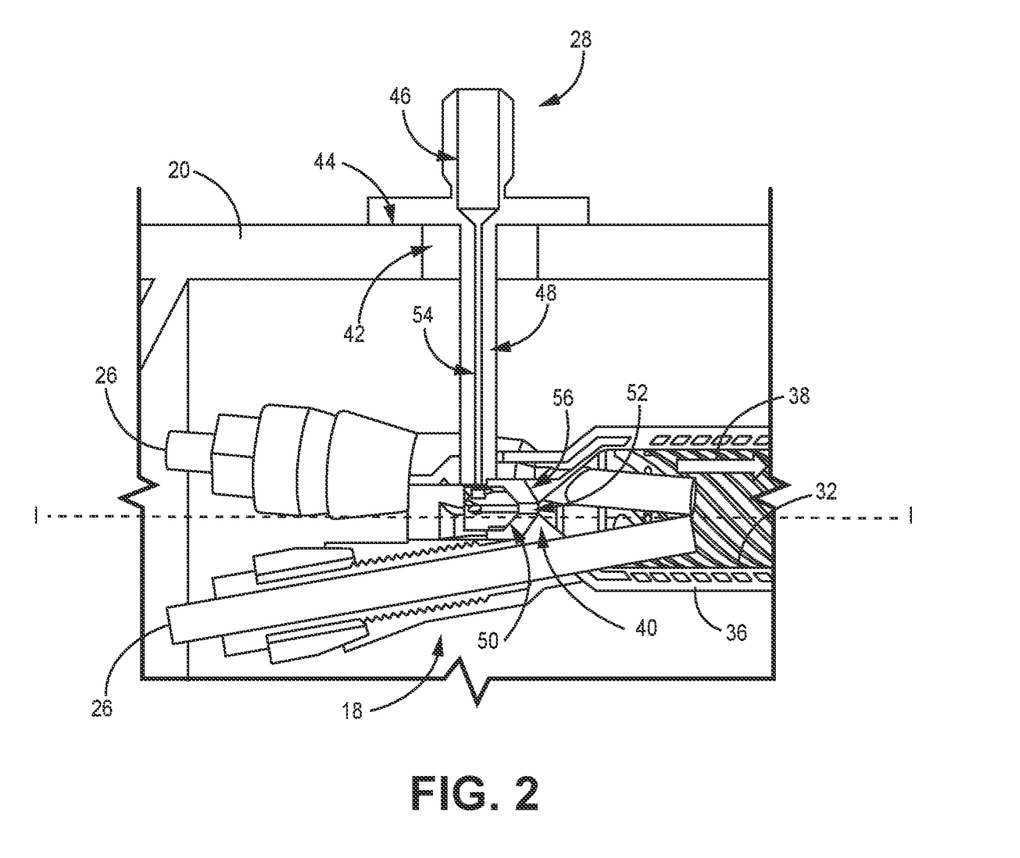
FIG. 2 is a cross-sectional view of an example of a cap section of the torch igniter of FIG. 1, illustrating a removable fuel injector.

FIG. 2 is a cross-sectional view of cap 18 of torch igniter 10. Igniter wall 32 surrounds the internal volume of torch igniter 10, which includes combustion chamber 30 and outlet passage 34, such that igniter wall 32 runs from the end of tip 14 to cap 18. Igniter wall 32 can be annular where it surrounds combustion chamber 30 and outlet passage 34, and can be dome-or cone-shaped where it extends to cap 18. In the example depicted in FIGS. 1 and 2, igniter wall 32 has a larger diameter where it surrounds combustion section 16 than where it surrounds outlet passage 34. Structural wall 36 coaxially surrounds igniter wall 32, and can be separated from igniter wall 32 by cooling channels. Igniter wall 32 is shown transparent in the cross section of FIGS. 1 and 2 for ease of viewing.

Torch igniter 10 is arranged such that tip 14, combustion section 16, and cap 18 are all oriented coaxially about torch igniter axis I-I. Arrow 38 shows the general direction of flow for fluids within combustion chamber 30 of torch igniter 10. Thus, torch igniter 10 has upstream and downstream ends oriented along torch igniter axis I-I and according to the direction of arrow 38. Combustion chamber 30 and outlet passage 34 are fluidly connected such that combustion products are able to flow from combustion chamber 30 toward tip 14 and to outlet passage 34. Combustion products are able to exit torch igniter 10 and enter an internal volume of a main combustor, such as combustor 24, via outlet passage 34. To this extent, cap 18 is disposed at the upstream end of torch igniter 10 and tip 14 is disposed at the downstream end of torch igniter 10. It should be understood, however, that tip 14 can be disposed at any suitable location on the downstream end of torch igniter 10, including any location not coaxial with torch igniter axis I-I.

During operation, torch igniter 10 causes combustion within combustion chamber 30. Hot combustion products exit torch igniter 10 into combustor 24 via outlet passage 34. Due to the positioning of torch igniter 10 within high pressure case 20, the portion of torch igniter 10 internal to structural wall 36 experiences only slightly less pressure as the area external to structural wall 36 during operation.

Torch igniter 10 causes combustion within combustion chamber 30 by using fuel injector 28 to inject a fuel-air mixture that impinges on the surface of glow plugs 26. Glow plugs 26 extend through cap 18, such that they each have an internal end disposed within combustion chamber 30 and an external end extending away from combustion chamber 30 and outside of cap 18. Further, glow plugs 26 can be resistively heated such that they are able to ignite the fuel-air mixture injected by fuel injector 28. Fuel injector 28 generally injects the fuel-air mixture in a conical volume that impinges on the internal end of glow plugs 26.

To improve ignition of fuel injected by fuel injector 28, torch igniter 10 can be configured with multiple glow plugs 26 at multiple locations within combustion chamber 30. Further, if the injection pattern of fuel injector 28 is distorted by coking, for example, using multiple glow plugs 26 at multiple locations within combustion chamber 30 can improve the likelihood that the injected fuel impinges on at least one glow plug 26. Glow plugs 26 can be distributed (e.g. circumferentially about torch igniter axis I-I) with internal ends spaced substantially evenly apart within combustion chamber 30 such that the fuel-air mixture from fuel injector 28 impinges on at least one glow plug 26 despite obstruction and regardless of orientation of the gas turbine engine as a whole. Alternatively or additionally, glow plugs 26 can be situated with internal ends at locations within combustion chamber 30 selected to ensure contact with the fuel-air mixture during anticipated operating conditions.

Glow plugs 26 are also connected to a power source capable of delivering electric current to the external end of glow plugs 26, allowing for the electrically-resistive heating of glow plugs 26. In examples where torch igniter 10 contains multiple glow plugs 26, they can be connected to more than one power source or can be connected in series, parallel, or a combination of arrangements to a single power source. Generally, glow plugs 26 are formed of a material capable of being resistively heated. For example, glow plugs 26 can be formed of a ceramic material, such as silicon nitride.

Fuel injector 28 is removably connected to torch igniter 10 through aperture 40 in cap 18 of torch igniter 10. Fuel injector 28 is positioned through opening 42 in high pressure case 20 and held in place within opening 42 by flange 44. Flange 44 is secured to high pressure case 20 with connectors, such as screw-on nuts, bolts, or screws, and creates a seal between fuel injector 28 and high pressure case 20, for example by using a C-seal or a tight tolerance metal-to-metal seal between the flange and case. Fuel injector 28 is composed of fuel inlet fitting 46, fuel injector feedarm 48, fuel distributor 50, and fuel prefilmer 52. Fuel injector 28 is connected to a fuel line via fuel inlet fitting 46. Fuel injector feedarm 48 extends from high pressure case 20 to aperture 40 in cap 18. Fuel injector feedarm 48 includes central passage 54 which provides a path for fuel to flow into torch igniter 10. Fuel injector 28 engages with seal 56 about aperture 40 of cap 18. In the depicted embodiment, fuel injector feedarm 48 includes a 90 degree turn to engage with seal 56. However, different embodiments are possible, such as embodiments with a turn at an angle other than 90 degrees or embodiments with a straight fuel injector feedarm which are axially loaded. Opening 42 is at least as wide as a width of fuel injector feedarm 48 and can accommodate lateral or diagonal movement of fuel injector 28 when fuel injector 28 is inserted or removed. Some embodiments can also include a high pressure air assist line that runs into fuel injector 28 to provide atomization.

In the embodiment depicted in FIG. 2, seal 56 consists of a flared conical area. However, seal 56 can also consist of crush washers, metallic C seals, or another form of seal. A tight seal is desirable for efficient torch igniter operation. Fuel injector feedarm 48 can act as a cantilever to provide or absorb the force necessary to provide a seal. The shape of fuel injector feedarm 48 can be tailored based on the load that needs to be provided, and can also account for factors such as vibration and combustor loading. Additionally or alternatively, torch igniter 10 can be pinned or contain embedded springs in order to provide the necessary load for seal 56.

Figure 3:
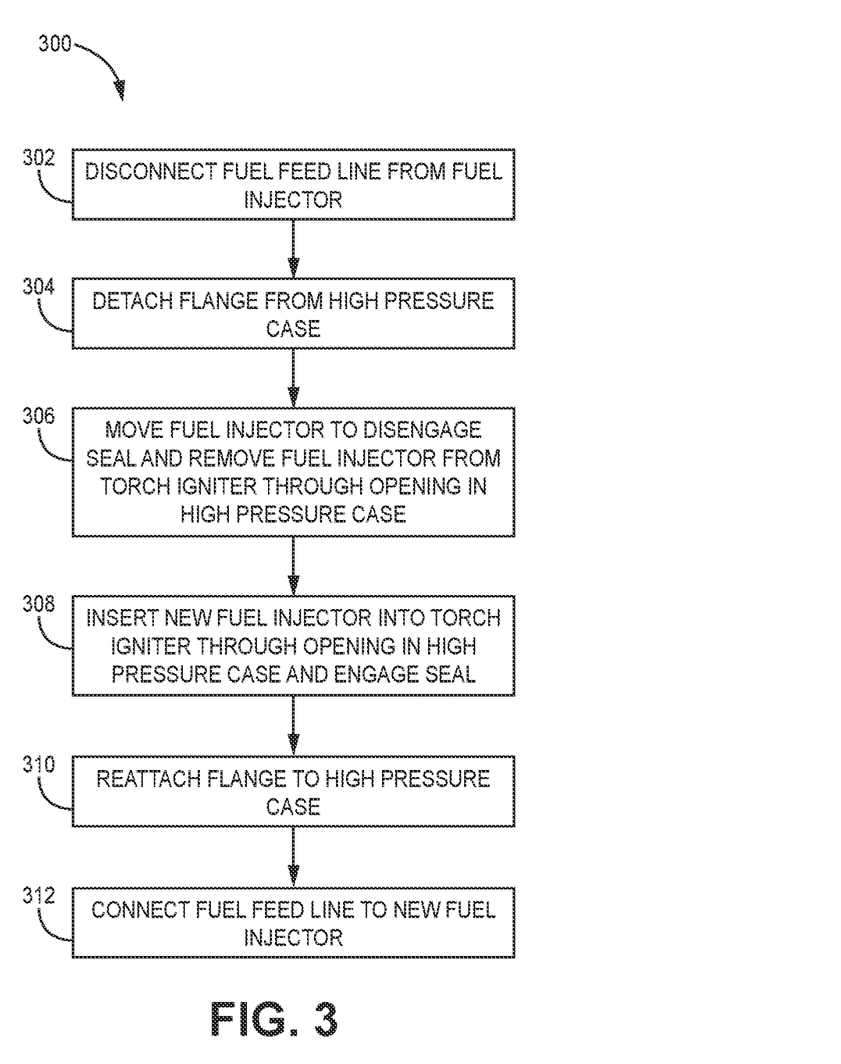
FIG. 3 is a flow chart depicting an example of a method of replacing a removable fuel injector.

FIG. 3 is an example of method 300 of replacing a fuel injector for a torch igniter within a gas turbine engine. Method 300 comprises disconnecting a fuel feed line from a fuel injector (step 302), detaching a flange from the high pressure case (step 304), moving the fuel injector to disengage it from a seal connecting the fuel injector to a torch igniter and removing the fuel injector from the main combustor through an opening in the high pressure case (step 306), inserting a new fuel injector through the opening in the high pressure case and engaging the seal (step 308), reattaching the flange to the high pressure case (step 310), and connecting the fuel feed line to the new fuel injector (step 312).

In step 302, a fuel feed line is disconnected from a fuel injector. The fuel feed line is connected to a fuel tank. The fuel injector can be self-draining, or step 302 can also include draining the fuel injector of excess fuel through the use of a valve or other mechanism for draining fuel.

After the fuel injector is disconnected from the fuel feed line, a flange which secures the fuel injector to the high pressure case is detached in step 304. The flange can be secured to the high pressure case with connectors such as bolts or screws. When attached, the flange holds the fuel injector in place within the opening in the case and creates a seal between the fuel injector and the opening in the high pressure case.

In step 306, the fuel injector is disengaged from a seal at an opening in the cap of the torch igniter and removed from the torch igniter through an opening in the high pressure case. The opening is at least as wide as the fuel injector feedarm and can be large enough to accommodate lateral or diagonal movement of the fuel injector within the opening. The seal can consist of a flared conical area, crush washers, metallic C seals, or other suitable seal. In the example depicted in FIG. 2, the fuel injector can be disengaged from the seal by moving the fuel injector laterally away from the seal area. Once the fuel injector is disengaged from the seal, the fuel injector can be freely removed from the high pressure case through the opening.

After removing the fuel injector, a new fuel injector can be inserted through the opening in the high pressure case in step 308. It should be noted that the "new" fuel injector is so named to differentiate it from the fuel injector in the state in which it is removed from the torch igniter. The new fuel injector can be, for example, a previously unused fuel injector, a refurbished fuel injector, or the original fuel injector which has been cleaned or refurbished. Depending upon the width of the opening and the width of the fuel injector feedarm, the fuel injector may be tilted to insert it through the opening. The new fuel injector can then engage the seal by, for example, moving laterally towards the seal. A tight seal is generally achieved during operation of the gas turbine engine. The fuel injector feedarm can act as a cantilever to provide or absorb the force necessary to provide a seal.

In step 310, the flange is reattached to the high pressure case using the connectors of step 304. As noted above, the flange holds the fuel injector in place within the opening in the high pressure case and creates a seal between the fuel injector and the opening in the high pressure case.

In step 312, the fuel feed line is connected to the new fuel injector. As noted above, the fuel feed line is connected to a fuel tank.

A fuel injector which is removable from a torch igniter allows the use of partially or entirely internally mounted torch igniters within a high pressure case without sacrificing accessibility of the fuel injector for maintenance, replacement, repair, or other purposes. Fuel injectors may have shorter lifespans than other parts within the high pressure case, and it is advantageous to be able to remove them separately while leaving the high pressure case intact. For example, fuel injectors may need to be replaced if fuel buildup occurs within the fuel injector to avoid uneven fuel spray.

Discussion of Possible Embodiments

The following are non-exclusive descriptions of possible embodiments of the present invention.

An exemplary embodiment of a combustor for a gas turbine engine oriented about an engine axis, among other possible things includes a combustor case extending along a primary combustor centerline to convey compressed airflow from a compressor to a turbine section, a combustor liner disposed within the combustor case to define a main combustor zone, a fuel nozzle situated at an upstream end of the combustor liner relative to the primary combustor centerline, a torch igniter situated within the combustor case, and a removable fuel injector. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one glow plug and at least one removable fuel injector, a tip defining the axially downstream end of the combustion chamber with respect to the torch igniter axis, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber. The removable fuel injector extends through a fuel injector opening of the combustor case having an opening diameter. The opening diameter is wider than a fuel injector diameter of the removable fuel injector. The combustion chamber is located within the combustor case.

The combustor of the preceding paragraph can optionally include, additionally and/or alternatively, any one or more of the following features, configurations and/or additional components:

A further embodiment of the foregoing combustor, further comprising a flange which is connected to the combustor case and which secures the removable fuel injector within the fuel injector opening and to the combustor case.

A further embodiment of any of the foregoing combustors, wherein the flange further comprises a flange seal surrounding the removable fuel injector.

A further embodiment of any of the foregoing combustors, wherein the flange seal is a C seal.

A further embodiment of any of the foregoing combustors, wherein the cap comprises an aperture which is configured to receive a fuel injector feedarm of the removable fuel injector and a seal which is configured to engage with the removable fuel injector, and a feedarm width of the fuel injector feedarm defines the fuel injector diameter.

A further embodiment of any of the foregoing combustors, wherein the seal comprises a flared conical area.

A further embodiment of any of the foregoing combustors, wherein the seal comprises a plurality of crush washers.

A further embodiment of any of the foregoing combustors, wherein the seal comprises a plurality of C seals.

A further embodiment of any of the foregoing combustors, wherein the torch igniter further comprises at least one embedded spring which exerts force on the removable fuel injector to engage the seal.

A further embodiment of any of the foregoing combustors, wherein the fuel injector feedarm includes a turn to engage with the seal.

A further embodiment of any of the foregoing combustors, wherein the fuel injector feedarm turns 90 degrees to engage with the seal.

A further embodiment of any of the foregoing combustors, wherein the feedarm width is defined by the section of the fuel injector feedarm between the seal and the turn of the fuel injector feedarm.

An embodiment of a method of replacing a first removable glow plug of a torch igniter includes, among other things disconnecting a fuel feed line from the first removable fuel injector, detaching a flange from a combustor case of the gas turbine engine, disengaging the first removable fuel injector from a cap of the torch igniter, removing the first removable fuel injector from the torch igniter through a fuel injector opening of the combustor case, inserting a second removable fuel injector into the fuel injector opening of the combustor case, engaging the second removable fuel injector with the cap of the torch igniter, reattaching the flange to the combustor case, and connecting the fuel feed line to the second removable fuel injector. The combustor case includes the fuel injector opening configured to receive a removable fuel injector and extends along a primary combustor centerline to convey compressed airflow from a compressor to a turbine section. The torch igniter includes a combustion chamber oriented about a torch igniter axis and having axially upstream and downstream ends defining a flow direction through the combustion chamber and along the torch igniter axis, the cap defining the axially upstream end of the combustion chamber and oriented about the torch igniter axis, a tip defining the axially downstream end of the combustion chamber, an igniter wall extending from the cap to the tip and defining a radial extent of the combustion chamber, a structural wall coaxial with and surrounding the igniter wall, and an outlet passage defined by the igniter wall within the tip and fluidly connected to the combustion chamber. The cap is configured to receive at least one surface igniter and a removable fuel injector. The combustion chamber of the torch igniter is located within the combustor case.

The method of the preceding paragraph can optionally include, additionally and/or alternatively, any one or more of the following features, configurations and/or additional components:

A further embodiment of the foregoing method, wherein the flange further comprises a flange seal surrounding the removable fuel injector.

A further embodiment of any of the foregoing methods, wherein the flange seal is a C seal.

A further embodiment of any of the foregoing methods, wherein the cap comprises an aperture which is configured to receive the removable fuel injector and a seal which is configured to engage with the removable fuel injector.

A further embodiment of any of the foregoing methods, wherein the seal comprises a flared conical area.

A further embodiment of any of the foregoing methods, wherein the seal comprises a plurality of crush washers.

A further embodiment of any of the foregoing methods, wherein the seal comprises a plurality of C seals.

A further embodiment of any of the foregoing methods, wherein engaging the second removable fuel injector with the cap of the torch igniter comprises providing force with a fuel injector feedarm of the second removable fuel injector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor of a gas turbine engine oriented about an engine axis, the combustor comprising:
   a combustor case extending along a primary combustor centerline to convey compressed airflow from a compressor to a turbine section;
   a combustor liner disposed within the combustor case to define a main combustor zone;
   a fuel nozzle situated at an upstream end of the combustor liner, relative to the primary combustor centerline;
   a removable fuel injector, wherein the removable fuel injector extends through a fuel injector opening of the combustor case having an opening diameter; and
   a torch igniter situated within the combustor case, the torch igniter comprising:
      a combustion chamber extending along a torch igniter axis, the combustion chamber having axially upstream and downstream ends defining a flow direction through the combustion chamber with respect to the torch igniter axis and situated within the combustor case;
      a cap defining the axially upstream end of the combustion chamber with respect to the torch igniter axis, wherein the cap is configured to receive at least one surface igniter and the removable fuel injector;
      a tip defining the axially downstream end of the combustion chamber with respect to the torch igniter axis;
      an annular igniter wall extending along and surrounding the torch igniter axis from the cap to the tip and defining a radial extent of the combustion chamber;
      a structural wall coaxial with and surrounding the igniter wall; and
      an outlet passage defined by the igniter wall within the tip, wherein the outlet passage is fluidly connected to the combustion chamber;
   wherein the opening diameter is wider than a fuel injector diameter of the removable fuel injector, the cap comprises an aperture which is configured to receive a fuel injector feedarm of the removable fuel injector and a seal which is configured to engage with the fuel injector feedarm of the removable fuel injector, and a feedarm width of the fuel injector feedarm defines the fuel injector diameter.

2. The combustor of claim 1, further comprising a flange which is connected to the combustor case and which secures the removable fuel injector within the fuel injector opening and to the combustor case.

3. The combustor of claim 2, wherein the flange creates a seal between the combustor case and the removable fuel injector.

4. The combustor of claim 1, wherein the seal comprises a flared conical area.

5. The combustor of claim 1, wherein the fuel injector feedarm includes a turn to engage with the seal.

6. The combustor of claim 5, wherein the fuel injector feedarm turns 90 degrees to engage with the seal.

7. The combustor of claim 6, wherein the feedarm width is defined by the section of the fuel injector feedarm between the seal and the turn of the fuel injector feedarm.

8. A method of replacing a first removable fuel injector for a torch igniter within a gas turbine engine, the method comprising:

disconnecting a fuel feed line from the first removable fuel injector;

detaching a flange from a combustor case of the gas turbine engine, the combustor case comprising a fuel injector opening configured to receive the first removable fuel injector, wherein the combustor case extends along a primary combustor centerline to convey compressed airflow from a compressor to a turbine section, the combustor further comprising a combustor liner disposed within the combustor case to define a main combustor zone and a fuel nozzle situated at an upstream end of the combustor liner relative to the primary combustor centerline;

disengaging the first removable fuel injector from a cap of the torch igniter, the torch igniter comprising:

a combustion chamber oriented about an axis, the combustion chamber having axially upstream and downstream ends defining a flow direction through the combustion chamber and along the axis, wherein the combustion chamber is located within the combustor case;

the cap defining the axially upstream end of the combustion chamber and oriented about the axis, wherein the cap is configured to receive at least one surface igniter and the first removable fuel injector, the opening diameter is wider than a fuel injector diameter of the removable fuel injector, the cap comprises an aperture which is configured to receive a fuel injector feedarm of the first removable fuel injector and a seal which is configured to engage with the fuel injector feedarm of the first removable fuel injector, and a feedarm width of the fuel injector feedarm defines the fuel injector diameter;

a tip defining the axially downstream end of the combustion chamber with respect to the axis;

an annular igniter wall extending from the cap to the tip and defining a radial extent of the combustion chamber;

a structural wall coaxial with and surrounding the igniter wall; and an outlet passage defined by the igniter wall within the tip, wherein the outlet passage is fluidly connected to the combustion chamber;

removing the first removable fuel injector from the torch igniter through the fuel injector opening of the combustor case;

inserting a second removable fuel injector into the fuel injector opening of the combustor case;

engaging the second removable fuel injector with the cap of the torch igniter;

reattaching the flange to the combustor case; and connecting the fuel feed line to the second removable fuel injector.

9. The method of claim 8, wherein the flange creates a seal between the combustor case and the first removable fuel injector.

10. The method of claim 8, wherein the seal comprises a flared conical area.

11. The method of claim 8, wherein engaging the second removable fuel injector with the cap of the torch igniter comprises providing force with a fuel injector feedarm of the second removable fuel injector.

\* \* \* \* \*